June 7, 1938.    F. S. CALDWELL    2,119,734
HEADLIGHT FOR VEHICLES
Filed March 13, 1936    2 Sheets-Sheet 1

INVENTOR.
FRED S. CALDWELL
BY
ATTORNEY.

June 7, 1938.  F. S. CALDWELL  2,119,734
HEADLIGHT FOR VEHICLES
Filed March 13, 1936  2 Sheets-Sheet 2

INVENTOR.
FRED S. CALDWELL
BY
ATTORNEY.

Patented June 7, 1938

2,119,734

UNITED STATES PATENT OFFICE 2,119,734

HEADLIGHT FOR VEHICLES

Fred S. Caldwell, Denver, Colo.

Application March 13, 1936, Serial No. 68,586

2 Claims. (Cl. 240—41.1)

My invention relates to improvements for headlights for automobiles and the like, and the principal objects of my improvements are:

First, to provide separate and independent means for projecting forward beams of light reflected from each of two sources of light which are concealed from view.

Second, to reduce the glare of the light without greatly impairing its power of illumination by first spreading the light from the concealed source over a reflector surface, the area of which very greatly exceeds the area of the light filament or other light source, thereby making it possible to use for the purpose of illumination the full power of the reflected beam by projecting the same forward through a lens of clear transparent glass instead of through a serrated lens the refracting effect of which diffuses the beam of light and thereby greatly impairs its power of illumination.

Third, to provide a separate and independent means of illuminating the roadway from the immediate front of a moving automobile to a distance of approximately 100 feet forward, and another separate and independent means of illuminating the roadway from a distance of approximately 100 feet forward from the front of a moving automobile to an indefinite distance beyond, which said two separate and independent means of illumination may at the option of the driver of the automobile be operated separately or conjointly.

Fourth, to provide two separate and independent beams from an automobile headlight, neither of which when operated alone, nor both of which when operated conjointly, will produce an offensive or objectionable glare to or upon the vision of an approaching driver.

With the above and other related objects in view my invention consists in the novel features and in the novel combination and arrangement of parts illustrated in the accompanying drawings forming a part of this specification, and particularly pointed out in the claims hereunto appended: it being understood that changes, variations and modifications in the details of the invention within the scope of the claims may be resorted to without departing from the spirit or sacrificing any of the advantages thereof. And particularly is it to be understood that the headlight lens as shown in Figures 1, 2 and 3 is illustrative merely and not intended to in any manner limit, exclude, impair or curtail the right to use a lens of whatever shape or form, according to the rules and formulas well known to the art, will best assist the reflector unit in directing the beam from the lower light upon the roadway from a point immediately in front of the automobile to a point approximately 100 feet beyond, and in directing the beam from the upper light upon the roadway from a point approximately 100 feet in front of the automobile to an indefinite distance beyond.

In the accompanying drawings,

Figure 6 is a detailed view showing in elevation the front face of the socket adapted to receive the light bulb and its retaining bracket.

Figure 1:
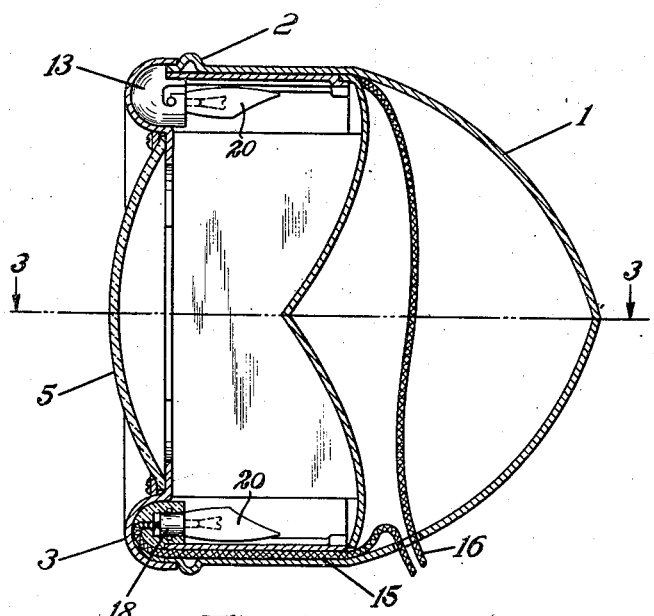
Figure 1 is a sectional view taken on the line I—I of Figure 2, showing in detail the reflecting surface and the position of the light source.

Referring to the accompanying drawings wherein like numerals designate like parts throughout the several figures, numeral 1 indicates the shell of the headlight. As shown in the drawings this shell is of circular form and having a somewhat elliptical shaped back portion. It is, of course, understood that while the drawings show the shell as circular in form, it may be of any desired shape and it also may be provided with means of any suitable structure whereby the shell is positioned upon the vehicle. The shell adjacent the front edge is provided with an annular bead 2, serving as a stop for a ring 3, the ring being provided with an inwardly extending circular flange 4, upon which is seated a lens 5 of any desired structure, the lens being retained in place by a ring 6 secured to the flange by screws or the like 7.

Figure 2:
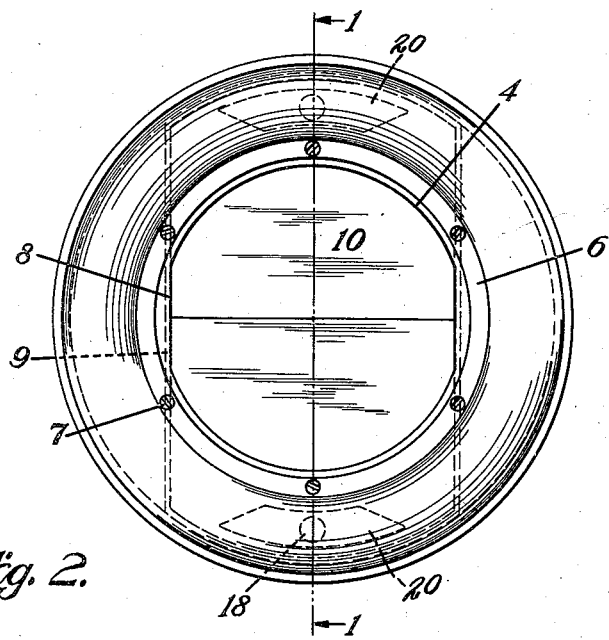
Figure 2 is a front elevation of the headlight.

As shown in Figure 2, the inner flange 4 of the circular ring projects inwardly as shown at 8, and abutting the edge of this inwardly projecting flange 8 is a portion of a side wall 9 carried by a reflector 10 positioned in the rear of the shell.

Figure 4:
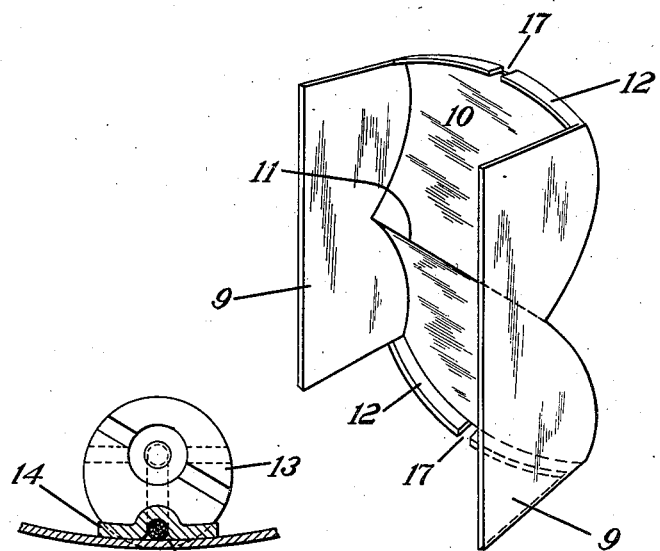
Figure 4 is a perspective view showing in detail the reflector which is positioned within the headlight shell.

As shown in Figure 4, this reflector is provided with side walls and a back, the upper half of which is curved downwardly and inwardly to the line 11, while the lower half is curved backwardly and downwardly from this line. The upper portion of the upper half, as well as the lower portion of the lower half, are each provided with an inwardly projecting flange 12, serving as the means by which the reflector may be secured to the shell of the headlight in any desired manner, preferably by spot welding.

Fitting within the ring 3 at diametrically opposite portions of the headlight shell and preferably on a vertical line are sockets 13 for the reception of suitable light bulbs of a character herein described. These sockets 13 are secured to bracket elements 14 which extend backwardly within the shell and over the retaining flanges 12 of the reflector. These brackets are secured to the shell preferably by spot welding. As shown in Figures 1 and 6 each bracket element is provided with a longitudinally extending groove 15 which receives therein a flexible conduit 16 serving to convey current to the socket. It will be observed in Figure 4 that the outstanding flanges 12 of the reflector are provided with slots 17 which align with the longitudinally extending grooves 15, so that the conduit may pass freely thereunder.

Figure 5:
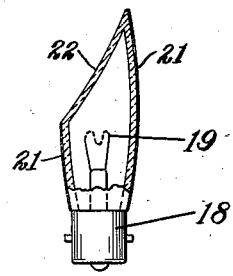
Figure 5 is a sectional view showing the specific structure of the light bulb.
Figure 3:
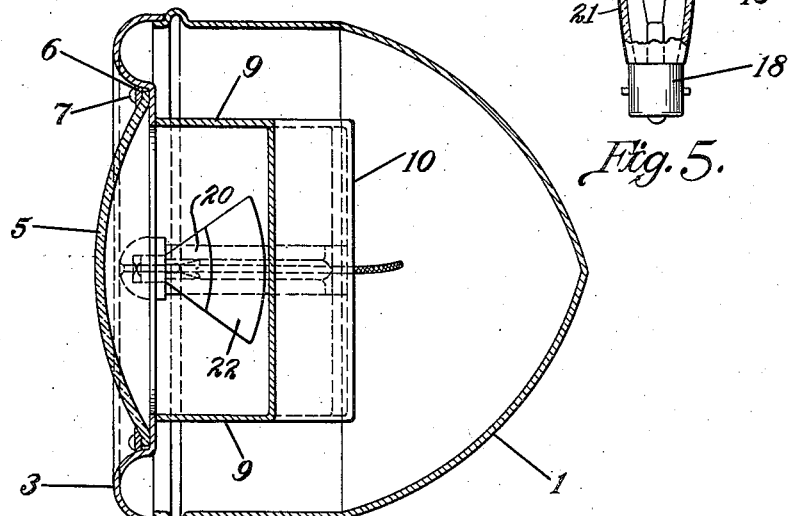
Figure 3 is a sectional view taken on the line 3—3 of Figure 1.

As shown in Figure 1 the socket 13 is provided with the usual bayonet slots which receive and hold in place the base 18 of a fan-shaped globe 20 having therein the usual filament 19. As shown in Figure 5 the side walls of this globe are provided with a reflecting substance 21, while the upper face 22 is clear, permitting all light emanating from the filament to be projected solely through the clear portion. Figures 2 and 3 further show the globe as being substantially of a fan-shape.

It will be observed from Figure 1 that the light bulbs are positioned in such a manner that no direct rays therefrom are projected outwardly through the lens, it being necessary that the rays pass backwardly through the clear portion of the bulb to the reflector and then from the reflector out through the lens. It is further understood that the reflector is constructed in accordance with well known rules and formulas whereby the rays of light passing from the light bulbs are reflected forwardly through the lens, the lower light bulb serving to provide the source of light for reflecting light downwardly adjacent the vehicle, while the light for the upper bulb is reflected forwardly in considerable advance of the vehicle.

While I have not shown in the drawings a definite arrangement of connecting the conduits for the several lights to a supply source, it is, of course, understood that any accepted method may be employed, provided of course that independent means are established for illuminating either one of the lights or both.

Having thus described the invention in detail, it will be, of course, obvious that all light passing out of the clear portion of the bulb will be reflected backwardly upon the reflector and the latter projecting the rays forwardly according to the shape of its reflecting surface.

One advantage which has been accomplished with the structure herein referred, and which particularly lies in the combination of the specific light bulb employed and reflector is that the light as it passes from the bulb floods the complete surface of its corresponding half of the reflector, thus permitting the reflection of all light passing from the bulb. The side walls carried by the reflector are for the purpose of preventing the loss of side rays within the shell and also serving as a means for reflecting back upon the curved portion of the reflector any side light that may strike thereupon.

What I claim is:

1. A headlight comprising a casing, a lens and a front rim closing the casing, a reflector positioned within the casing and provided with downwardly and upwardly curved portions meeting on a horizontal line through the axis of the lens, light sources concealed within the front rim having reflecting surfaces positioned so as to direct light therefrom upon the curved portions of the reflector, and each of said light sources having a substantial fan-shape face through which light passes wherein all light emanating therefrom floods one entire curved portion of the reflector only.

2. A headlight comprising a casing, a lens and a front rim closing the casing, a reflector positioned within the casing and provided with downwardly and upwardly curved portions meeting on a horizontal line through the axis of the lens, light sources concealed within the front rim and positioned so as to direct light therefrom downwardly and upwardly upon the curved portions of the reflector, and said light sources having reflecting surfaces and a substantial fan-shape face through which light passes wherein all light emanating therefrom floods one entire curved portion of the reflector only.

FRED S. CALDWELL.